US00RE45705E

(19) United States
(12) Reissued Patent
Tokoro et al.

(10) Patent Number: US RE45,705 E
(45) Date of Reissued Patent: Sep. 29, 2015

(54) DATA COMMUNICATION SYSTEM, DATA COMMUNICATION APPARATUS, AND DATA COMMUNICATION METHOD FOR GENERATING OR DETECTING AN EVENT

(75) Inventors: Mario Tokoro, Tokyo (JP); Junichi Rekimoto, Tokyo (JP); Yuji Ayatsuka, Tokyo (JP); Shigeru Tajima, Tokyo (JP)

(73) Assignee: Sony Corporation, Tokyo (JP)

(21) Appl. No.: 13/357,227

(22) Filed: Jan. 24, 2012

Related U.S. Patent Documents

Reissue of:

(64) Patent No.: 7,653,655
Issued: Jan. 26, 2010
Appl. No.: 10/468,273
PCT Filed: Nov. 21, 2002
PCT No.: PCT/JP02/12151
§ 371 (c)(1),
(2), (4) Date: Feb. 2, 2004
PCT Pub. No.: WO03/053007
PCT Pub. Date: Jun. 26, 2003

(30) Foreign Application Priority Data

Dec. 17, 2001 (JP) ..... 2001-383481

(51) Int. Cl.
*G06F 7/00* (2006.01)
*G06F 17/30* (2006.01)
*H04L 29/08* (2006.01)

(52) U.S. Cl.
CPC ..... *H04L 67/04* (2013.01); *G06F 17/30017* (2013.01)

(58) Field of Classification Search
USPC ..... 707/758
See application file for complete search history.

(56) References Cited

U.S. PATENT DOCUMENTS

| | | | | |
|---|---|---|---|---|
| 5,717,955 | A * | 2/1998 | Swinehart | 710/62 |
| 5,793,630 | A * | 8/1998 | Theimer et al. | 700/11 |
| 5,845,482 | A * | 12/1998 | Carscallen | 60/785 |
| 6,380,923 | B1 * | 4/2002 | Fukumoto et al. | 345/156 |
| 6,456,958 | B1 * | 9/2002 | Xydis | 702/158 |
| 6,674,993 | B1 * | 1/2004 | Tarbouriech | 455/2.01 |
| 6,907,021 | B1 * | 6/2005 | Nelson | 370/338 |

(Continued)

FOREIGN PATENT DOCUMENTS

| | | |
|---|---|---|
| JP | 11-85435 | 3/1999 |
| JP | 2001-144781 | 5/2001 |
| JP | 2001-156704 | 6/2001 |

OTHER PUBLICATIONS

Nobuyuki Matsushita, Shigeru Tajima, Yuji Ayatsuka, Jun Rekimoto: Wearable Key: Device for Personalizing Nearby Environment. ISWC 2000: 119-126.*

(Continued)

*Primary Examiner* — Robert Beausoliel, Jr.
*Assistant Examiner* — Michael Pham
(74) *Attorney, Agent, or Firm* — Sherr & Jiang, PLLC

(57) ABSTRACT

In general, those who are right in front of each other can share actual world events that are generated in the same working space. For example, when an audio or a light of a wave form pattern is generated, by recognizing such an actual world event, both communication apparatuses share the actual world event. Also, a shock wave generated when one communication apparatus is hit with the other is shared by both. One of the communication partners searches a network for a communication partner who is right in front with the actual world event as a clue. Thus, it is possible to perform data communications with a communication partner whose location in the actual world is clear, such as being right in front, but whose identification information in the communication medium is unknown.

8 Claims, 13 Drawing Sheets

(56) References Cited

U.S. PATENT DOCUMENTS

| | | | | |
|---|---|---|---|---|
| 6,930,987 | B1 * | 8/2005 | Fukuda et al. | 370/328 |
| 6,934,376 | B1 * | 8/2005 | McLaughlin et al. | 379/212.01 |
| 6,961,555 | B1 * | 11/2005 | Philyaw | 455/403 |
| 2003/0018708 | A1 * | 1/2003 | Hlasny | 709/203 |
| 2003/0079003 | A1 * | 4/2003 | Burr | 709/221 |
| 2004/0137845 | A1 * | 7/2004 | Vonheim et al. | 455/41.2 |
| 2004/0203381 | A1 * | 10/2004 | Cahn et al. | 455/41.2 |
| 2005/0120096 | A1 * | 6/2005 | Rekimoto et al. | 709/220 |

OTHER PUBLICATIONS

Jun Rekimoto and Katashi Nagao. "The World Through the Computer: Computer Augmented Interaction with Real World Environments". Proceedings of UIST'95. pp. 29-36. 1995.*

Rekimoto, Jun. "Pick-and-Drop: A Direct Manipulation Technique for Multiple Comptuer Environments". ACM Symposium on User Interface Software and Technology. 1997: 31-39.*

Estrin et al., Scalable Coordination in Sensor Networks, Technical Report 99-692, University of Southern California, Jan. 1999.

* cited by examiner

DATA COMMUNICATION SYSTEM, DATA COMMUNICATION APPARATUS, AND DATA COMMUNICATION METHOD FOR GENERATING OR DETECTING AN EVENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 7,653,655. The reissue applications are U.S. patent application Ser. Nos. 14/815,258 (the continuation reissue application), and 13/357,227 (the present, parent reissue application), all of which are reissues of U.S. Pat. No. 7,653,655.*

TECHNICAL FIELD

The present invention relates to a data communication system, a data communication apparatus and a data communication method for performing data communications via a communication medium, and relates particularly to a data communication system, a data communication apparatus and a data communication method for performing data communications with a communication partner whose identification information in a communication medium is unknown.

More precisely, the present invention relates to a data communication system, a data communication apparatus and data communication method for performing data communications with a communication partner whose location in the actual world is clear, such as being right in front, but whose identification information in a communication medium is unknown, and relates particularly to a data communication system, data communication apparatus and data communication method for performing data communications by searching for a communication partner whose location in the actual world is clear, such as being right in front, but whose identification information in a communication medium is unknown.

BACKGROUND ART

In modern times, where information processing technology and information communications technology are highly developed, information devices such as personal computers and mobile information terminals are ubiquitous in the actual world such as offices and households. In such an environment, the realization of "ubiquitous computing" where desired information can be obtained anytime and anywhere by inter-connecting devices is anticipated.

The concept of ubiquitous computing is that the available computer environment is the same wherever people move to. In other words, since it is "anytime and anywhere," the ultimate ubiquitous computing does not necessarily require information terminals such as computers, personal digital assistants (PDAs), mobile phones and the like, necessarily.

However, when one tries to specify a computer or peripheral device which is to be a data transmission destination (in other words, a target) in a network, or when one tries to obtain information related to an object in the actual world, even if it is a partner that is right in front, there is a need to know the name thereof (or resource identification information, such as an ID, network address, host name, URL (Uniform Resource Locator), that is unique to the device). In other words, with respect to user operations, computers are only coordinated indirectly, and are lacking in intuitiveness.

DISCLOSURE OF THE INVENTION

The object of the present invention lies in providing a superior data communication system, data communication apparatus and data communication method, which are capable of performing data communications with a communication partner whose identification information in a communication medium is unknown.

A further object of the present invention lies in providing a superior data communication system, data communication apparatus and data communication method, which are capable of suitably performing data communications with a communication partner whose location in the actual world is clear, such as being right in front, but whose identification information in a communication medium is unknown.

A further object of the present invention lies in providing a superior data communication system, data communication apparatus and data communication method, which are capable of performing data communications by searching for a communication partner whose location in the actual world is clear, such as being right in front, but whose identification information in a communication medium is unknown.

The present invention is made in consideration of the problems mentioned above, and the first aspect thereof is a data communication system or a data communication method for performing data communications via a data communication medium, the data communication system or the data communication method characterized in that it includes, event generation means or step for generating a unique actual world event in which a device, which is to be a communication partner, exists, and for sharing information related to the event with the device that is to be the communication partner, and searching means or step for specifying the communication partner by searching the communication medium mentioned above for a device, which shares the same actual world event.

However, "system" as recited above refers to one in which a plurality of apparatuses (or functional modules which realize specific functions) are logically aggregated, regardless as to whether or not the respective apparatuses and functional modules exist within a single housing.

A data communication system or a data communication method according to the first aspect of the present invention is one which makes it possible to search for a communication partner, whose location in the actual world is clear, such as being right in front, but whose identification information in the communication medium is unknown, and perform data communications.

In general, those who are right in front of each other can share actual world events that occur in the same working space. For example, when audio or a light of a particular wave form pattern is generated in the actual world, by recognizing such actual world events, their information devices can share event content information that tells that audio or light of the same wave form pattern is detected, or event time information that tells that the generation of an event was detected at the same time. Alternatively, when an actual world event is generated through physical contact, such as hitting one communication apparatus with the other communication apparatus, they can mutually share event content information comprising shock wave patterns generated upon physical contact and event time information. In addition, by not giving an actual world event to anyone other than the communication partner, the sharing of the same actual world event may become identification information for specifying the communication partner.

According to a data communication system or a data communication method related to the first aspect of the present invention, by generating a unique actual world event and sharing this between specific communication devices, one communication partner can search for the communication partner, who is right in front, in a network with the actual world event as a clue.

In addition, the second aspect of the present invention is a data communication apparatus or data communication method for specifying a communication partner via a communication medium and performing data communications, the data communication apparatus or data communication method characterized in that it includes, event generation/detection means or step for generating or detecting an actual world event, and searching means or step for searching in the communication medium mentioned above for a device that shares the same actual world event and specifying a communication partner.

A data communication apparatus or a data communication method according to the second aspect of the present invention is one which makes it possible to perform data communications via a communication medium by searching for a communication partner whose location in the actual world is clear, such as being right in front, but whose identification information in the communication medium is unknown.

In general, those who are right in front of each other can share actual world events that occur in the same working space. In addition, by not giving an actual world event to anyone other than the communication partner, the sharing of the same actual world event may become identification information for specifying the communication partner.

According to a data communication system or a data communication method related to the second aspect of the present invention, by detecting an actual world event taking place right in front and searching in a network for a device that shares this actual world event, a communication partner present right in front can be specified in the network.

Further objects, characteristics and advantages of the present invention should become apparent from the embodiments of the present invention described below and from a more detailed description based on the appended drawings.

BEST MODE FOR CARRYING OUT THE INVENTION

Embodiments of the present invention will be described in detail below with reference to the drawings.

The present invention is a data communication system that enables data communications to be performed via a communication medium by searching for a communication partner whose location in the actual world is clear, such as such as being right in front, but whose identification information in a communication medium is not known.

In general, those who are immediately in front of each other can share actual world events generated in the same working space. For example, when audio or light of a certain waveform pattern is generated in the actual world, by recognizing such actual world events, their communication apparatuses can share event content information that tells that audio or light of the same wave form pattern is detected, or event time information that tells that the generation of an event was detected at the same-time. Alternatively, when an actual world event comprising physical contact, such as one communication apparatus hitting the other communication apparatus, is generated, event content information comprising the same shock wave pattern and event time information can be mutually shared. In addition, by not giving an actual world event to anyone other than the communication partner, the sharing of the same actual world event may become identification information for specifying the communication partner. The data communication system according to the present invention is one that searches a network for a communication partner located immediately in front with an actual world event shared between communication devices as a clue.

Figure 1:
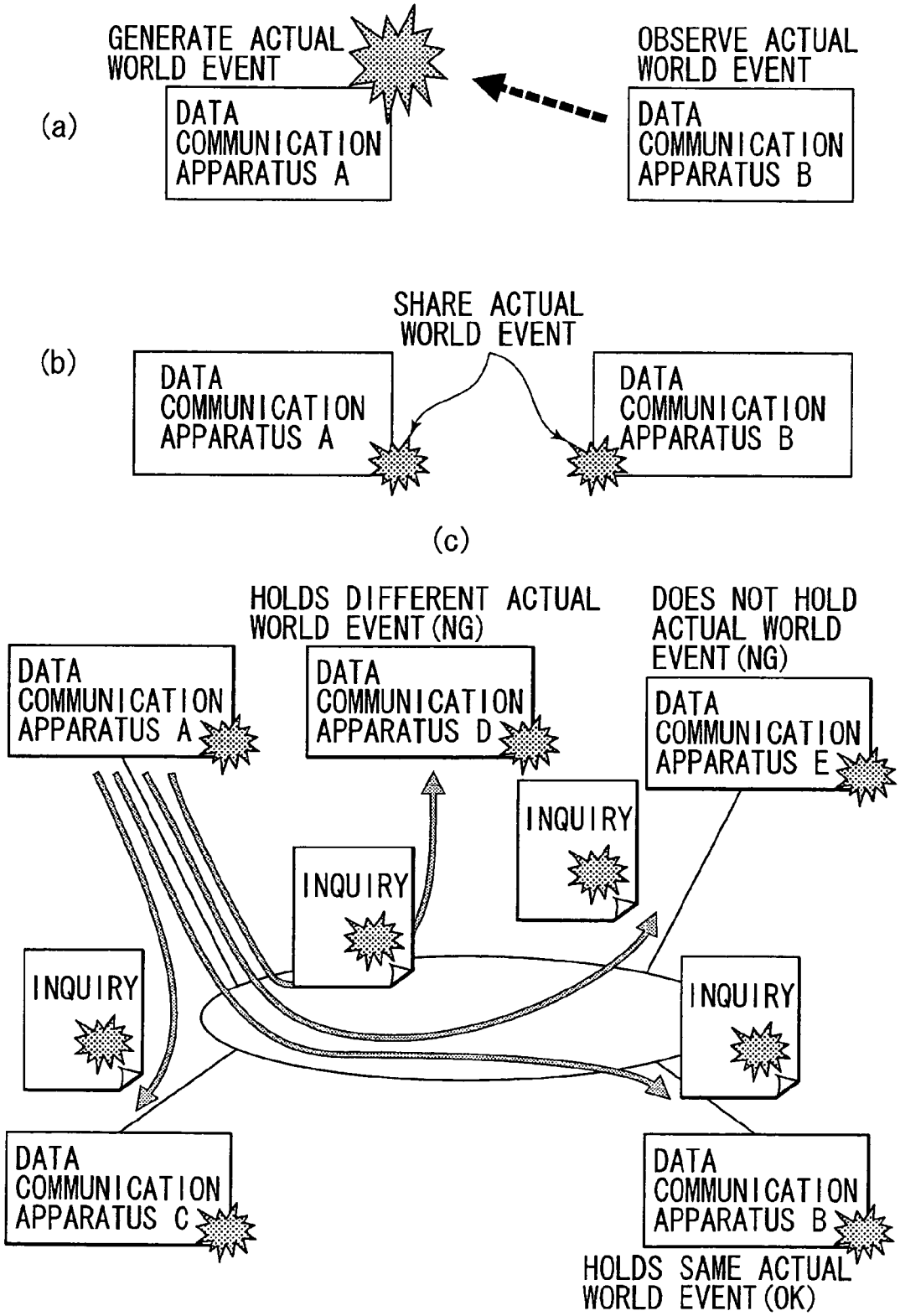
FIG. 1 is a diagram schematically showing the basic configuration of a data communication system according to an embodiment of the present invention.

In FIG. 1, the basic configuration of a data communication system according to the present invention is shown schematically. In the example shown in the same drawing, two data communication apparatuses A and B, which are to be communication partners, are mutually connected via a network. The respective data communication apparatuses A and B are in front of each other and can share actual world events generated in the same work space. However, it is assumed that the respective data communication apparatuses do not know the network identification information (IP addresses and the like) of each other at all.

At a certain time, one data communication apparatus A generates an actual world event, whose uniqueness is insured within at least the same working space (refer to FIG. 1(a)). A unique actual world event as mentioned above may utilize audio or visible light that has the same wave form pattern, or a shock wave obtained by applying a physical contact such as hitting the data communication apparatus B with the data communication apparatus A, and the like.

In such a case, since the data communication apparatus B located immediately in front of the data communication, apparatus A can observe the actual world event, the data communication apparatuses A and B can share the same actual world event (Refer to FIG. 1(b)). Here, the data communication apparatus A stores the content of the actual world event it generated itself (for example, the wave form pattern of the generated audio or light, or the wave form pattern of the shock wave and the like) and the time at which the actual world event was generated. Also, the data communication apparatus B similarly stores the content of the actual world event it observed itself and the observation time thereof.

Thereafter, the data communication apparatus A is able to find the data communication apparatus B as a desired communication partner by searching a network for a data communication apparatus that shares the same actual world event based on the content information of the actual world event that it stores itself and/or the time information thereof (refer to FIG. 1(c)). The search in the network can be realized, for example, by broadcasting an inquiry including, for example, the content information and the time information of the actual world event on the network. Of course, a communication partner sharing the actual world event may be searched for by a communication scheme other than broadcasting.

Such an operation for searching for a communication partner may be started immediately after the generation of the actual world event. Of course, even if it is after a considerable period of time has elapsed, so long as it is while the actual world event is stored, it may be executed any time.

Also, instead of having the data communication apparatus A side that generated the actual world event perform it, the data communication apparatus B that observed the actual world event may perform the search. In other words, any data communication apparatus that shares the actual world event can specify a communication partner based on the actual world event.

Figure 2:
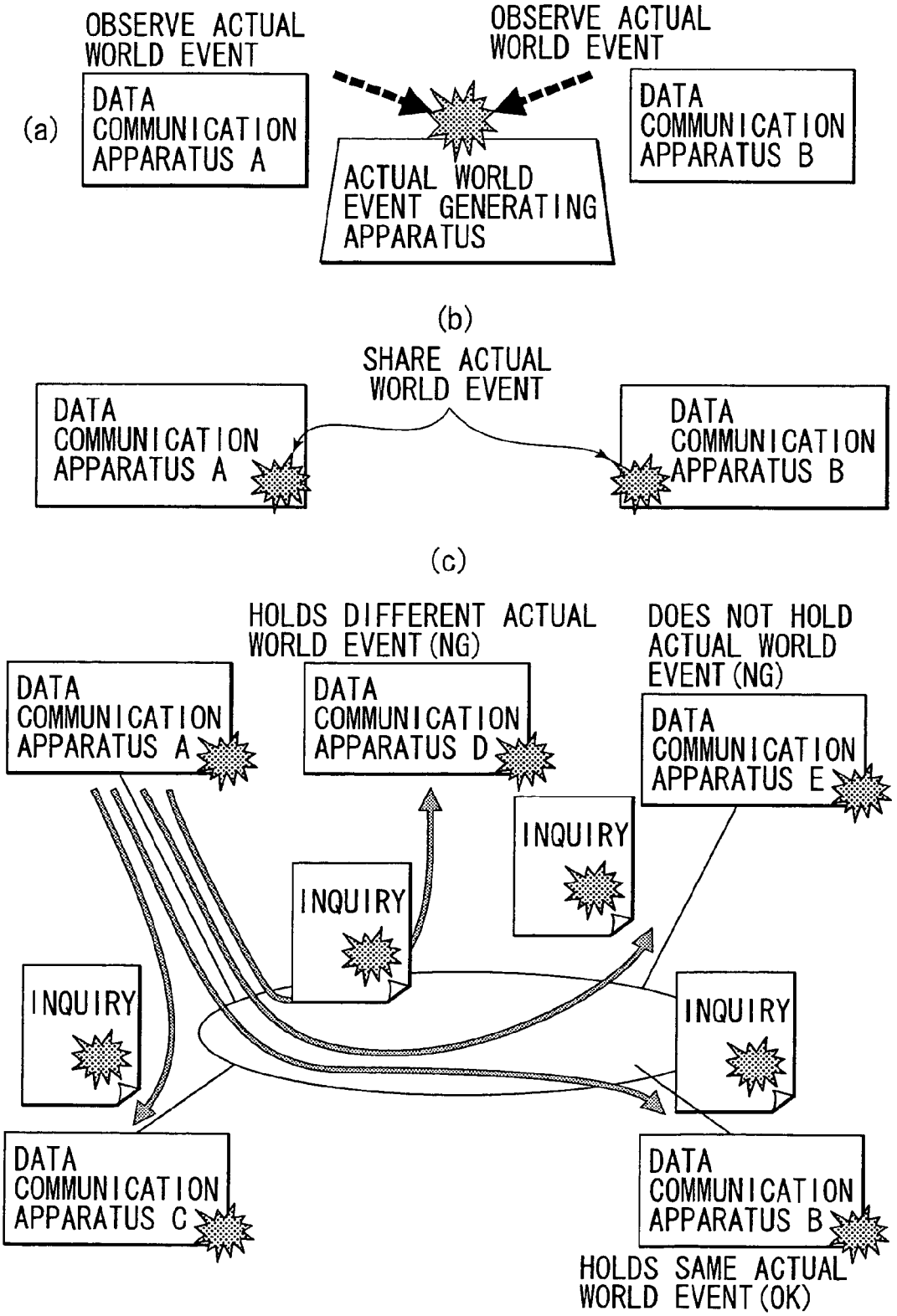
FIG. 2 is a diagram schematically showing a modification of the basic configuration of the data communication system according to an embodiment of the present invention.

Also, in FIG. 2, a modification of the basic configuration of a data communication system according to the present invention is shown schematically. In the example shown in the same drawing, two data communication apparatuses A and B, which are to be communication partners, are interconnected via a network. The respective data communication apparatuses A and B are in front of each other and can share actual world events generated in a work space. However, it is assumed that the respective data communication apparatuses do not know the network identification information (IP addresses and the like) of each other at all.

The point that is different from the data communication system shown in FIG. 1 is the fact that an apparatus other than the data communication system that performs data communications generates the actual world event, and that the data communication apparatuses A and B share it. In other words, an actual world event generating apparatus generates the actual world event whose uniqueness is insured within at least the same working space (refer to FIG. 2(a)). The unique actual world event as referred to above may be audio or visible light having the same wave form pattern.

In such a case, since the data communication apparatuses A and B located within the same working space can observe actual world events, they can share the same actual world event (refer to FIG. 2(b)). The data communication apparatuses A and B each store the contents of the actual world events it observes itself and observation times thereof.

Thereafter, the data communication apparatus A can find the data communication apparatus B as a communication partner by searching the network for a data communication apparatus that shares the same actual world event based on the content information of the actual world event it stores itself and/or the time information thereof (refer to FIG. 2(c)). The search in the network can be realized, for example, by broadcasting an inquiry including the content information and the time information of the actual world event on the network. Of course, a communication partner sharing the actual world event may be searched for by a communication scheme other than broadcasting.

Figure 3:
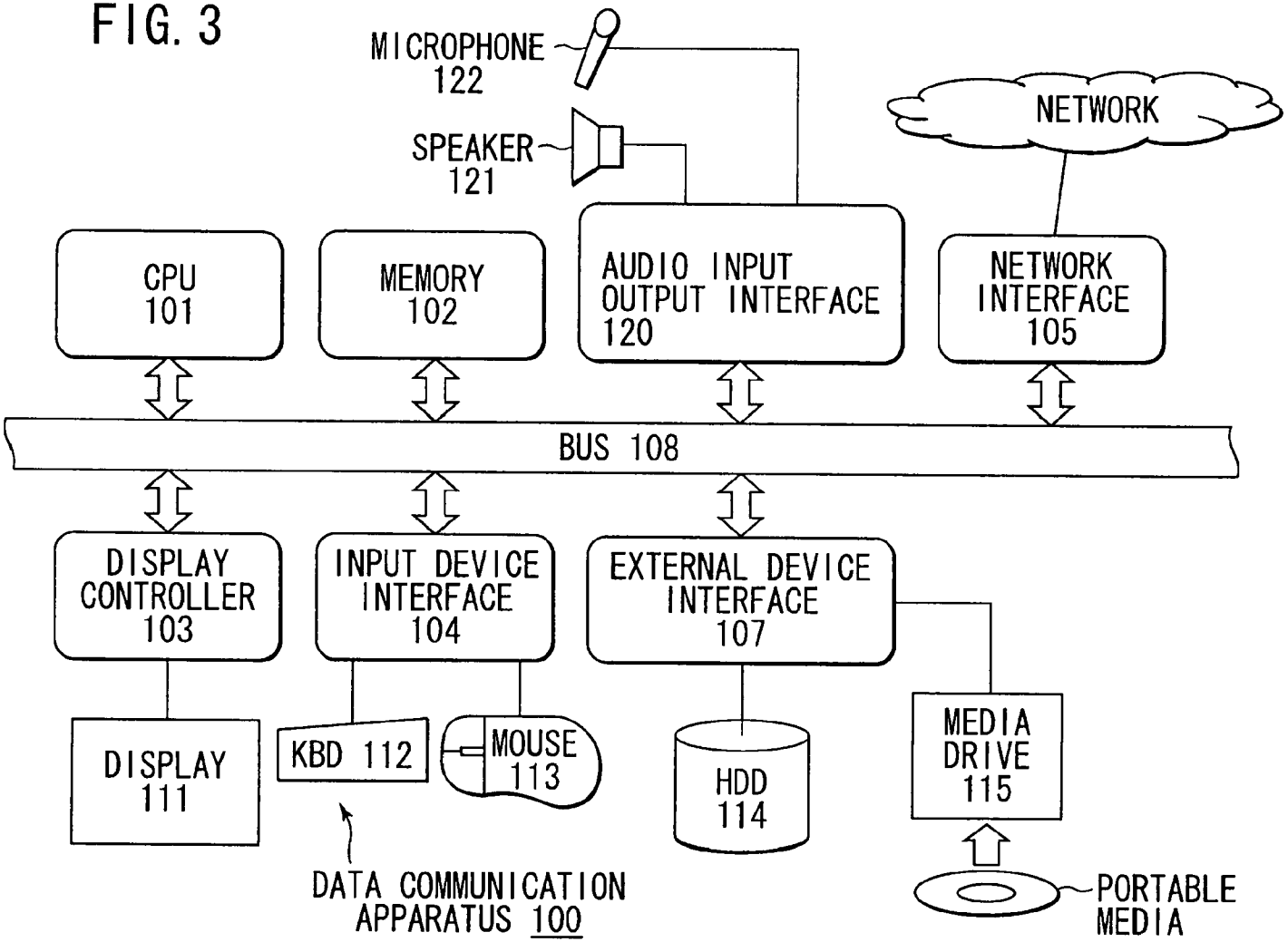
FIG. 3 is a diagram schematically showing the hardware configuration of a data communication apparatus 100 of a type that shares an actual world event by audio.

In FIG. 3, the hardware configuration of a data communication apparatus 100 of a type that shares an actual world event comprising audio is shown schematically.

A CPU (Central Processing Unit) 101, which is the main controller of the system 100, executes various applications under the control of an operating system (OS). The CPU 101 can execute, for example, a communication application and an application program for generating and observing actual world events, sharing actual world events, and searching for communication partners using shared actual world events, and the like. As shown in the drawing, the CPU 101 is interconnected with other devices and the like (which will be described later) via a bus 108.

A memory 102 is a memory apparatus that is used to store program codes executed in the CPU 101 and for temporarily holding work data under execution. It should be understood that the memory 102 shown in the same drawing includes both a non-volatile memory such as a ROM and the like and a volatile memory such as a DRAM and the like.

A display controller 103 is a dedicated controller for actually processing a drawing command issued by the CPU 101. Drawing data processed by the display controller 103 is first written to, for example, a frame buffer (not shown) and is then outputted on screen by a display 111.

An input device interface 104 is an apparatus for connecting user input devices such as a keyboard 112, a mouse 113 and the like to the computer system 100.

A network interface 105 can connect the system 100 to a network such as a LAN (local Area Network) and the like in accordance with a predetermined communications protocol such as Ethernet and the like.

An external device interface 107 is an apparatus for connecting external apparatuses, such as a hard disk drive (HDD) 114, a media drive 115 and the like, to the system 100.

The HDD 114 is a (known) external memory apparatus in which a magnetic disk as a memory substrate is fixedly mounted, and it is superior to other external memory apparatuses on points such as memory capacity, data transfer rate and the like. An operation for placing a software program on the HDD 114 in an executable condition is referred to as an "installation" of the program to the system. Program codes of the operating system, application programs, device drivers and the like to be executed by the CPU 101, for example, are stored in a non-volatile condition in the HDD 114.

Also, the media drive 115 is an apparatus in which a portable medium such as a CD (Compact Disc), an MO (Magneto-Optical disc), a DVD (Digital Versatile Disk) or the like is loaded, and which is for accessing the data recording surface thereof.

An audio input output interface 120 is an apparatus for externally outputting, from a speaker 121, an audio signal comprising a predetermined waveform pattern in accordance with an instruction from the CPU 101 for outputting an audio signal, or for importing an externally generated audio signal as computer data by inputting it via a microphone 122.

When audio signals are handled as actual world events, it should be understood fully that the speaker 121 can function as an actual world event generating apparatus and that the microphone 122 can function as an actual world event observing apparatus. Also, many information processing terminals, such as personal computers, come with an audio input output apparatus comprising a combination of a speaker and a microphone as standard equipment. Typically, this type of audio input output apparatus is not utilized much. However, as in this embodiment, by handling audio signals as actual world events, it leads to an efficient use of these apparatuses, while at the same time, the sharing of actual world events can be achieved without increasing costs.

In addition, an example of the data communication apparatus 100 as shown in FIG. 3 is a personal computer, such as a compatible machine or a succeeding machine or the like of the personal computer "PC/AT (Personal Computer/Advanced Technology)" of IBM Corp. (U.S.A.). Of course, information processing terminals having a different architecture, such as, for example, PDAs (Personal Digital Assistants), mobile phones and the like, can also be applied as the data communication apparatus 100 according to the present embodiment.

Figure 4:
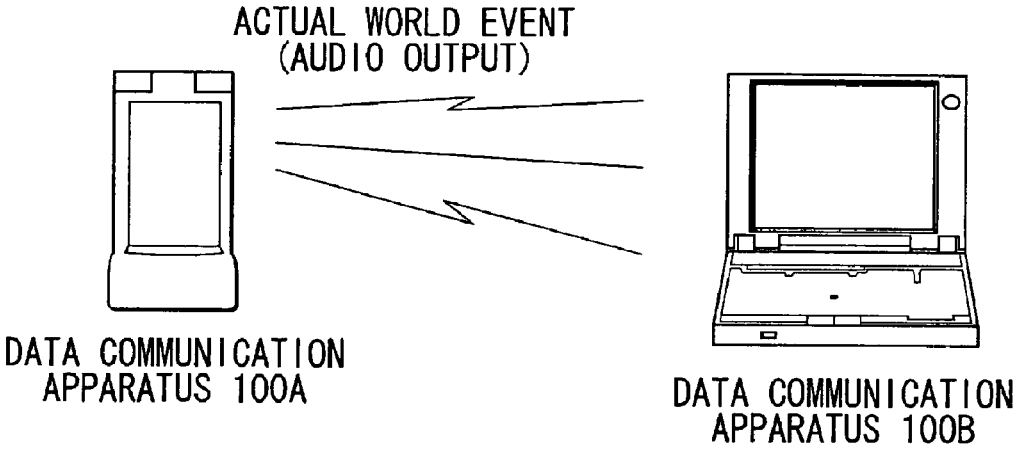
FIG. 4 is a diagram showing how two data communication apparatuses having a configuration similar to the one shown in FIG. 3 share output audio as an actual world event.

In FIG. 4, there is shown a manner in which an output audio as an actual world event is shared between two data communication apparatuses having a configuration similar to the one shown in FIG. 3. In the example shown in the same drawing, a data communication apparatus 100A that generates an actual world event is configured as a small portable information terminal such as a PDA (Personal Digital Assistant) or the like. Also, a data communication apparatus 100B that observes the actual world event is configured as a personal computer (PC) of a notebook type.

It is assumed that the data communication apparatuses 100A and 100B are owned by the same user or are respectively owned by users in the same group and that they are placed in close proximity such that actual world events can be shared. Also, although not shown in drawing, the data communication apparatuses 100A and 100B can be connected via a communication medium capable of data communications such as a LAN (Local Area Network) and the like.

For example, in a case where the data communication apparatus 100A wants to specify the data communication apparatus 100B as a communication partner, when the data communication apparatus 100A outputs an audio comprising a unique waveform pattern, the other data communication apparatus 100B is able to detect this. The data communication apparatus 100A stores the waveform pattern of the audio it generated itself as content information of an actual world event and/or stores the time at which it outputted the audio as generation time information of the actual world event. Also, the data communication apparatus 100B stores the waveform pattern of the audio that it was able to detect as content information of an actual world event, and/or stores the time at which the audio was inputted as generation time information of the actual world event. As a result, between the data communication apparatuses 100A and 100B, the sharing of an actual world event is realized. Thereafter, the data communication apparatuses 100A and 100B can use the mutually shared actual world event as a clue and thereby search for a communication partner in the network.

Figure 5:
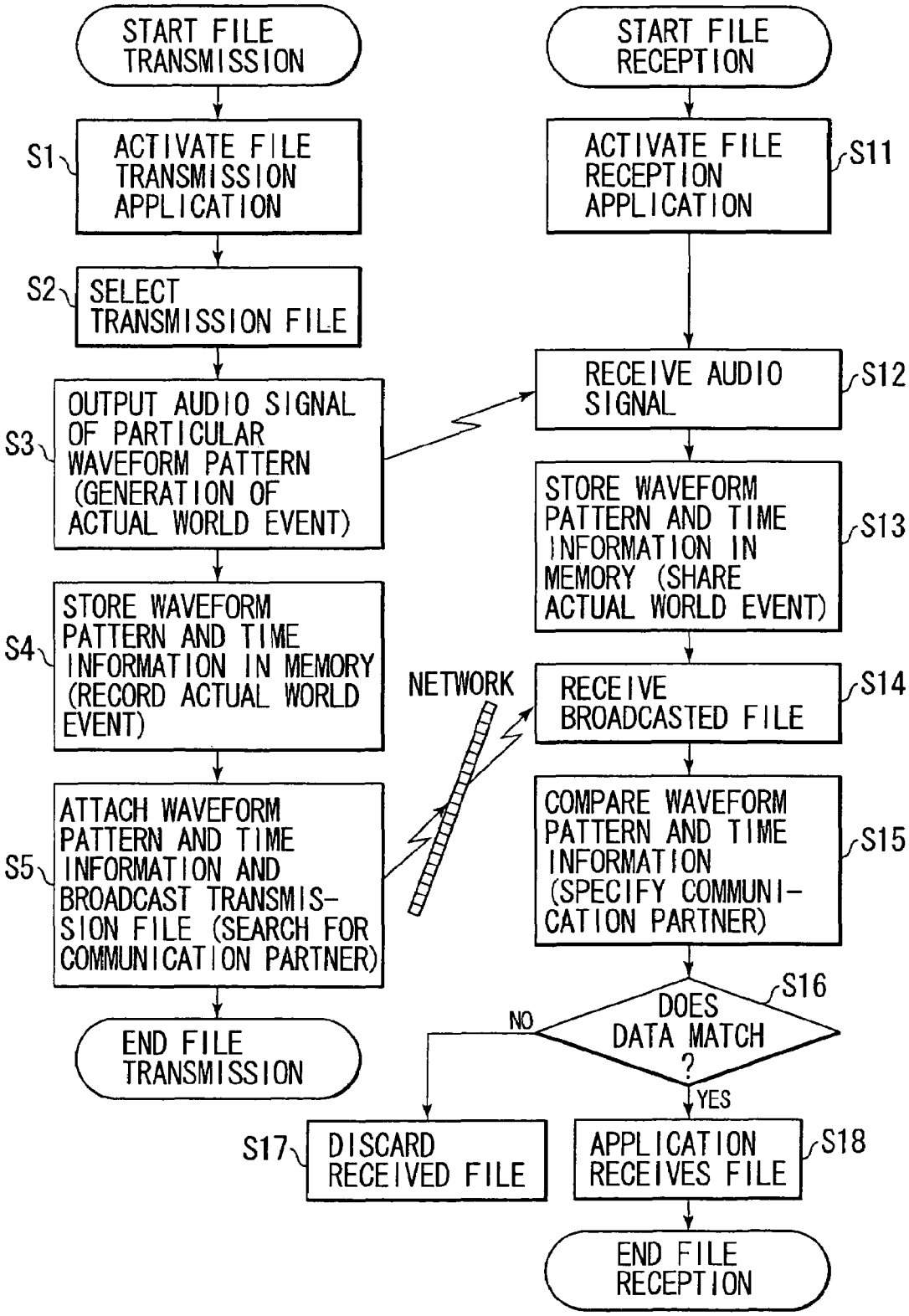
FIG. 5 is a flow chart showing a procedure for network transferring a file between data communication apparatuses using the sharing of an actual world event comprising audio.

In FIG. 5, there is shown in the form of a flow chart a processing procedure for network-transferring a file between data communication apparatuses using the sharing of an actual world event comprising audio. Such a process, in actuality, is realized in a mode that the CPU 101 of each of the data communication apparatuses 100A and 100B executes a predetermined application program and performs a cooperative operation. The network transferring process based on the sharing of an actual world event will be described below with reference to this flowchart.

A data communication apparatus A as a file transmitting source, namely a PDA (hereafter simply referred to as PDA), activates a file transmission application (Step S1) and selects a transmission file (Step S2) using, for example, a menu screen (not shown) displayed on a display.

Next, an audio signal comprising a unique waveform pattern is outputted from the speaker 121 towards the data communication apparatus 100B, namely a PC, (hereafter simply referred to as PC) which is to be a communication partner (Step S3).

At this point, the waveform pattern of the audio signal it outputted itself and/or the generation time thereof is stored in the memory 102 (Step S4).

Then, the PDA as the file transmitting source, after generating the actual world event comprising the audio signal, attaches the actual world event content information and/or the time information stored in the memory 102 to the transmission file selected in step S2, and broadcasts it on the network (Step S5) and ends the file transmission process.

On the other hand, the PC side, which is a transmission destination of the file, activates a file reception application (Step S11) and waits until an audio signal as an actual world event is inputted.

Then, when an audio signal as an actual world event is generated, this is captured by the microphone 122 (Step S12), the waveform pattern is recognized, and this is stored in the memory 102 as actual world event content information together with the detected time information (Step S13).

Thereafter, when the file broadcasted via the network is received (Step S14), the actual world event content information and/or the time information attached to the transmission file is extracted, and this is compared with the actual world event content information and/or the time information it stores itself (Step S15), and it is judged whether or not it shares the same actual world event as the data communication apparatus of the file transmission source.

If the actual world event content information and/or the time information does not match (Step S16), the same actual world event is not shared. Thus, it can be judged that the data communication apparatus of the file transmission source is not the correct communication partner (refer to FIG. 1(c)). Hence, the received file is discarded (Step S17).

On the other hand, if the actual world event content information and/or the time information does match (Step S16), the same actual world event is shared. Thus, it can be judged that the data communication apparatus of the file transmission source is the correct communication partner (refer to FIG. 1(c)). Hence, the application performs a receiving process on the broadcasted file (Step S18).

In addition, although the PDA, which is the file transmission source, also transmits the time information in addition to the actual world event content information in order to search for a communication partner in the network, if uniqueness is sufficiently insured with the actual world event content information alone, only the actual world event content information need be attached to the transmission file. Of course, if uniqueness is sufficiently insured even with just the information on the time at which the actual world event was generated, a communication partner can be specified by merely attaching the time information.

Figure 6:
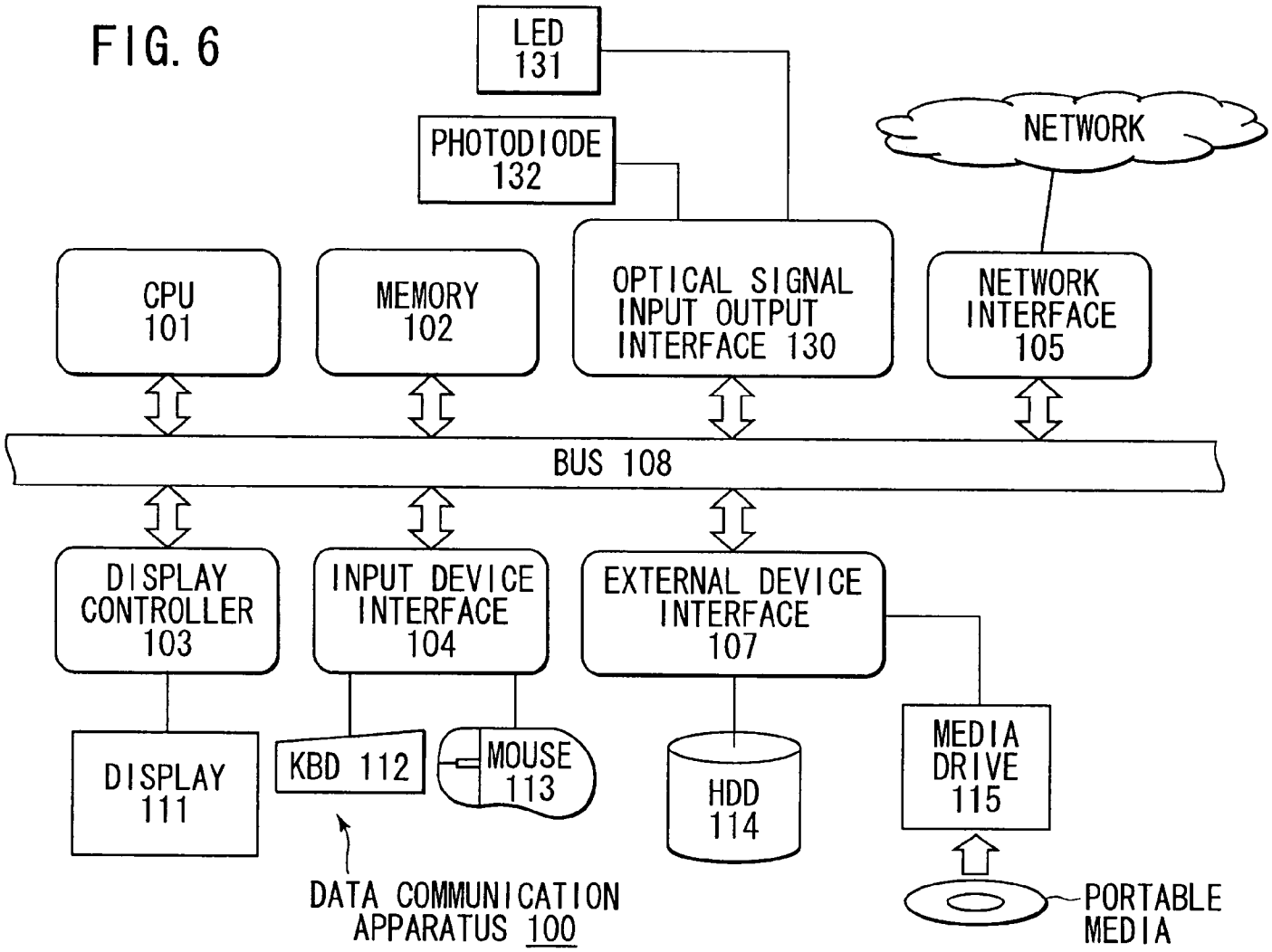
FIG. 6 is a diagram schematically showing the hardware configuration of a data communication apparatus 100 of a type that shares an actual world event by light.

In FIG. 6, there is shown schematically the hardware configuration of the data communication apparatus 100 of a type that shares an actual world event by optical signal.

The CPU (Central Processing Unit) 101, which is the main controller of the system 100, executes various applications under the control of an operating system (OS). The CPU 101 can execute, for example, a communication application and an application program for generating and observing actual world events, sharing actual world events, and searching for communication partners using shared actual world events, and the like. As shown in the drawing, the CPU 101 is interconnected with other devices and the like (which will be described later) via the bus 108.

The memory 102 is a memory apparatus that is used to store program codes executed in the CPU 101 and for temporarily holding work data under execution. It should be understood that the memory 102 shown in the same drawing includes both a non-volatile memory such as a ROM and the like and a volatile memory such as a DRAM and the like.

The display controller 103 is a dedicated controller for actually processing a drawing command issued by the CPU 101. Drawing data processed by the display controller 103 is first written to, for example, a frame buffer (not shown) and is then outputted on screen by the display 111.

The input device interface 104 is an apparatus for connecting user input devices such as the keyboard 112, the mouse 113 and the like to the computer system 100.

The network interface 105 can connect the system 100 to a network such as a LAN (local Area Network) and the like in accordance with a predetermined communications protocol such as Ethernet and the like.

The external device interface 107 is an apparatus for connecting external apparatuses, such as the hard disk drive (HDD) 114, the media drive 115 and the like, to the system 100.

The HDD 114 is a (known) external memory apparatus in which a magnetic disk as a memory substrate is fixedly mounted, and it is superior to other external memory apparatuses on points such as memory capacity, data transfer rate and the like. An operation for placing a software program on the HDD 114 in an executable condition is referred to as an "installation" of the program to the system. Program codes of the operating system, application programs, device drivers and the like to be executed by the CPU 101, for example, are stored in a non-volatile condition in the HDD 114.

Also, the media drive 115 is an apparatus in which a portable medium such as a CD (Compact Disc), an MO (Magneto-Optical disc), a DVD (Digital Versatile Disk) or the like is loaded, and which is for accessing the data recording surface thereof.

An optical signal input output interface 130 is an apparatus for externally outputting, from an LED 131, an optical signal comprising a predetermined waveform pattern in accordance with an output instruction of an optical signal from the CPU 101, or importing as computer data an externally generated optical signal by inputting it via a photodiode 132.

When optical signals are handled as actual world events, it should be understood fully that the LED 131 can function as an actual world event generating apparatus and that the photodiode 132 can function as an actual world event observing apparatus.

In addition, an example of the data communication apparatus 100 as shown in FIG. 6 is a personal computer, such as a compatible machine or a succeeding machine or the like of the personal computer "PC/AT (Personal Computer/Advanced Technology)" of IBM Corp. (U.S.A.). Of course, information processing terminals having a different architecture, such as, for example, PDAs (Personal Digital Assistants), mobile phones and the like, can also be applied as the data communication apparatus 100 according to the present embodiment.

Figure 7:
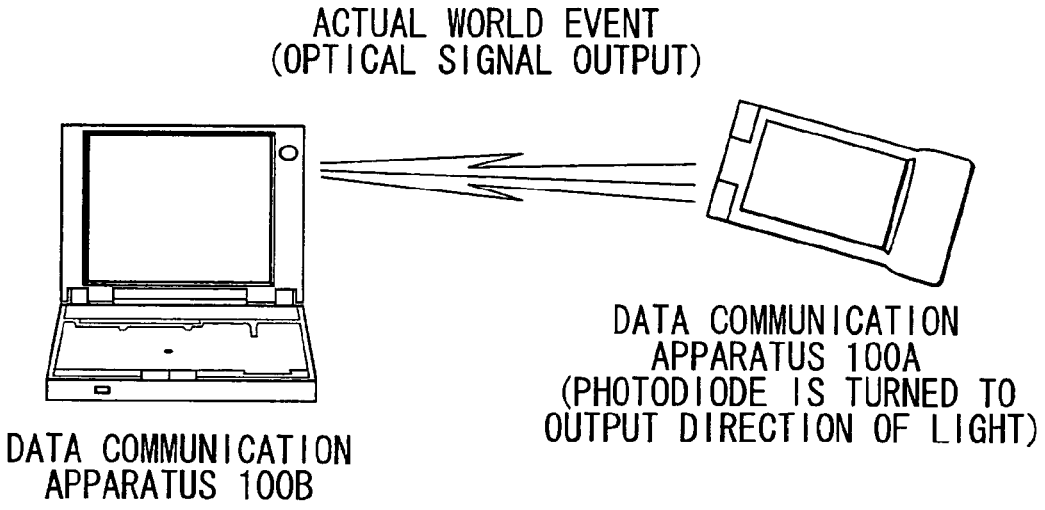
FIG. 7 is a diagram showing how output audio as an actual world event is shared between two data communication apparatuses having a configuration similar to the one shown in FIG. 6.

In FIG. 7, there is shown a manner in which an output optical signal as an actual world event is shared between two data communication apparatuses having a configuration similar to the one shown in FIG. 6. In the example shown in the same drawing, the data communication apparatus 100A that generates an actual world event is configured as a personal computer (PC) of a notebook type. Also, the data communication apparatus 100B that observes the actual world event is configured as a small portable information terminal such as a PDA (Personal Digital Assistant) or the like.

It is assumed that the data communication apparatuses 100A and 100B are owned by the same user or are respectively owned by users in the same group and that they are placed in close proximity such that actual world events can be shared. Also, although not shown in drawing, the data communication apparatuses 100A and 100B can be connected via a communication medium capable of data communications such as a LAN (Local Area Network) and the like.

For example, in a case where the data communication apparatus 100A wants to specify the data communication apparatus 100B as a communication partner, when the data communication apparatus 100A outputs an optical signal comprising a waveform pattern in which a unique data is modulated, the other data communication apparatus 100B, if it wants to be a communication partner of the data communication apparatus 100A, observes the actual world event by turning the light receiving surface of its own photodiode towards the transmission direction of the light.

The data communication apparatus 100A stores the waveform pattern of the optical signal it generated itself as content information of an actual world event and/or stores the time at which it outputted the optical signal as generation time information of the actual event. Also, the data communication apparatus 100B stores the waveform pattern of the optical signal that it was able to detect as content information of an actual world event, and/or stores the time at which the optical signal was inputted as generation time information of the actual world event. As a result, between the data communication apparatuses 100A and 100B, the sharing of an actual world event is realized. Thereafter, the data communication apparatuses 100A and 100B can use the mutually shared actual world event as a clue and thereby search for a communication partner in the network.

Figure 8:
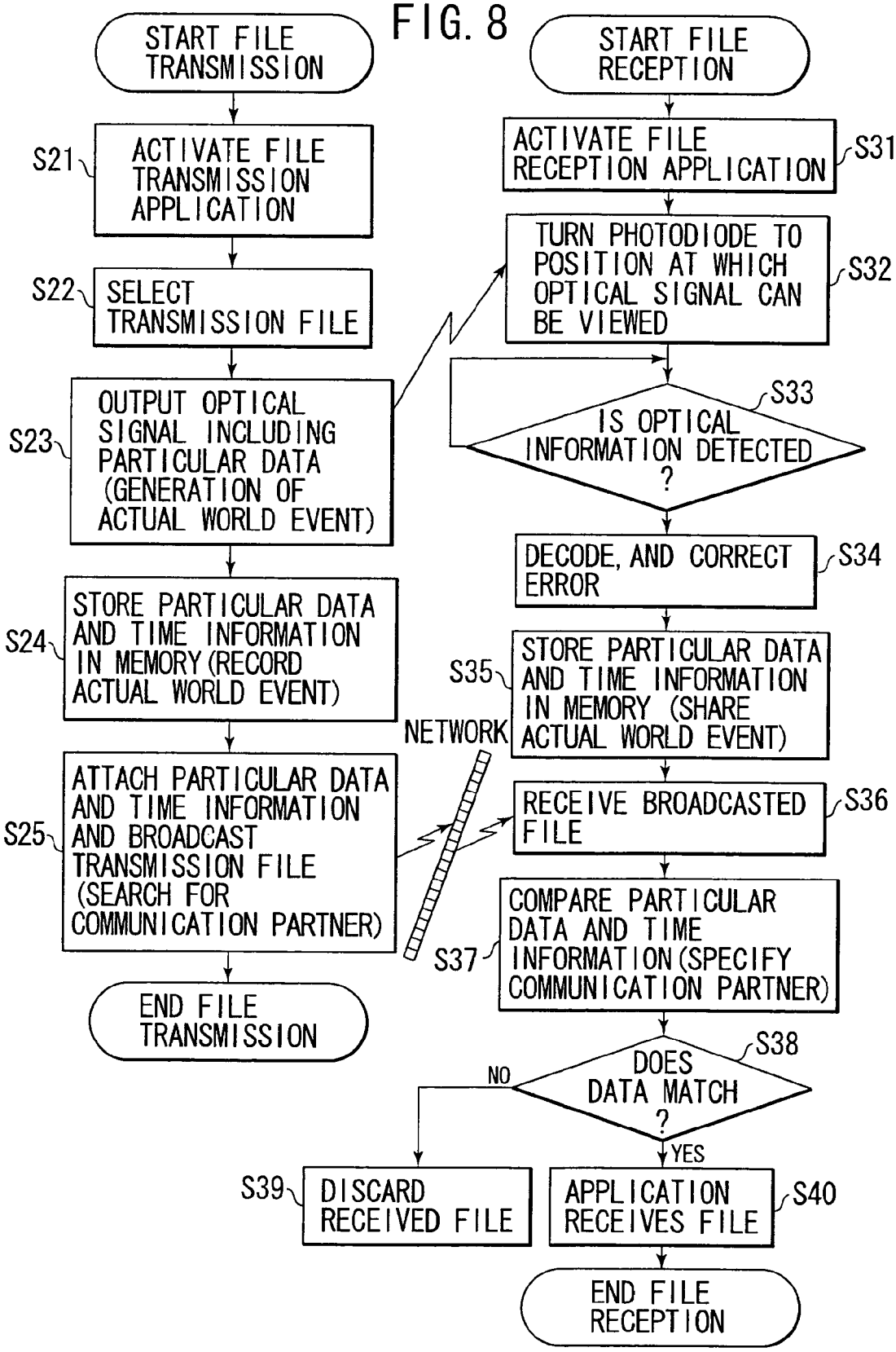
FIG. 8 is a flow chart showing a procedure for network transferring a file between data communication apparatuses using the sharing of an actual world event comprising optical signals.

In FIG. 8, there is shown in the form of a flow chart a processing procedure for network-transferring a file between data communication apparatuses using the sharing of an actual world event comprising an optical signal. Such a process, in actuality, is realized in a mode that the CPU 101 of each of the data communication apparatuses 100A and 100B executes a predetermined application program and performs a cooperative operation. The network transferring process based on the sharing of an actual world event will be described below with reference to this flowchart.

The data communication apparatus A as a file transmitting source, namely a PC (hereafter simply referred to as PC), activates a file transmission application (Step S21) and selects a transmission file (Step S22) using, for example, a menu screen (not shown) displayed on a display.

Next, an optical signal comprising a unique waveform pattern obtained by modulation processing a unique data is outputted from the LED131 (Step S23).

At this time, the unique data it outputted itself and/or the generation time thereof is stored in the memory 102 (Step S24).

Then, the PC serving as the file transmitting source, after generating the actual world event comprising the optical signal, attaches the actual world event content information and/or the time information stored in the memory 102 to the transmission file selected in step S22, and broadcasts it on the network (Step S25) and ends the file transmission process.

On the other hand, the PDA side, which is a transmission destination of the file, activates a file reception application (Step S31), turns the photodiode to a position at which the optical signal radiated from the LED of the PC side, which is the file transmission source, can be viewed (Step S32) and waits until an optical signal as an actual world event is inputted (Step S33).

Then, when an optical signal as an actual world event is received by the photodiode, this is decoded and the unique data is extracted, and after a predetermined error correction is performed (Step S34), this is stored in the memory 102 as actual world event content information together with the detected time information (Step S35).

Thereafter, when the file broadcasted via the network is received (Step S36), the actual world event content information and/or the time information attached to the transmission file is extracted, and this is compared with the actual world event content information and/or the time information it stores itself (Step S37), and it is judged whether or not it shares the same actual world event as the data communication apparatus of the file transmission source.

If the actual world event content information and/or the time information does not match (Step S38), the same actual world event is not shared. Thus, it can be judged that the data communication apparatus of the file transmission source is not the correct communication partner (refer to FIG. 1C). Hence, the received file is discarded (Step S39).

On the other hand, if the actual world event content information and/or the time information does match (Step S38), the same actual world event is shared. Thus, it can be judged that the data communication apparatus of the file transmission source is the correct communication partner (refer to FIG. 1C). Hence, the application performs a receiving process on the broadcasted file (Step S40).

In addition, although the PC serving as the file transmission source also transmits the time information in addition to the actual world event content information in order to search for a communication partner in the network, if uniqueness is sufficiently insured with the actual world event content information alone, only the actual world event content information need be attached to the transmission file. Of course, if uniqueness is sufficiently insured even with just the information on the time at which the actual world event was generated, a communication partner can be specified by merely attaching the time information.

Figure 9:
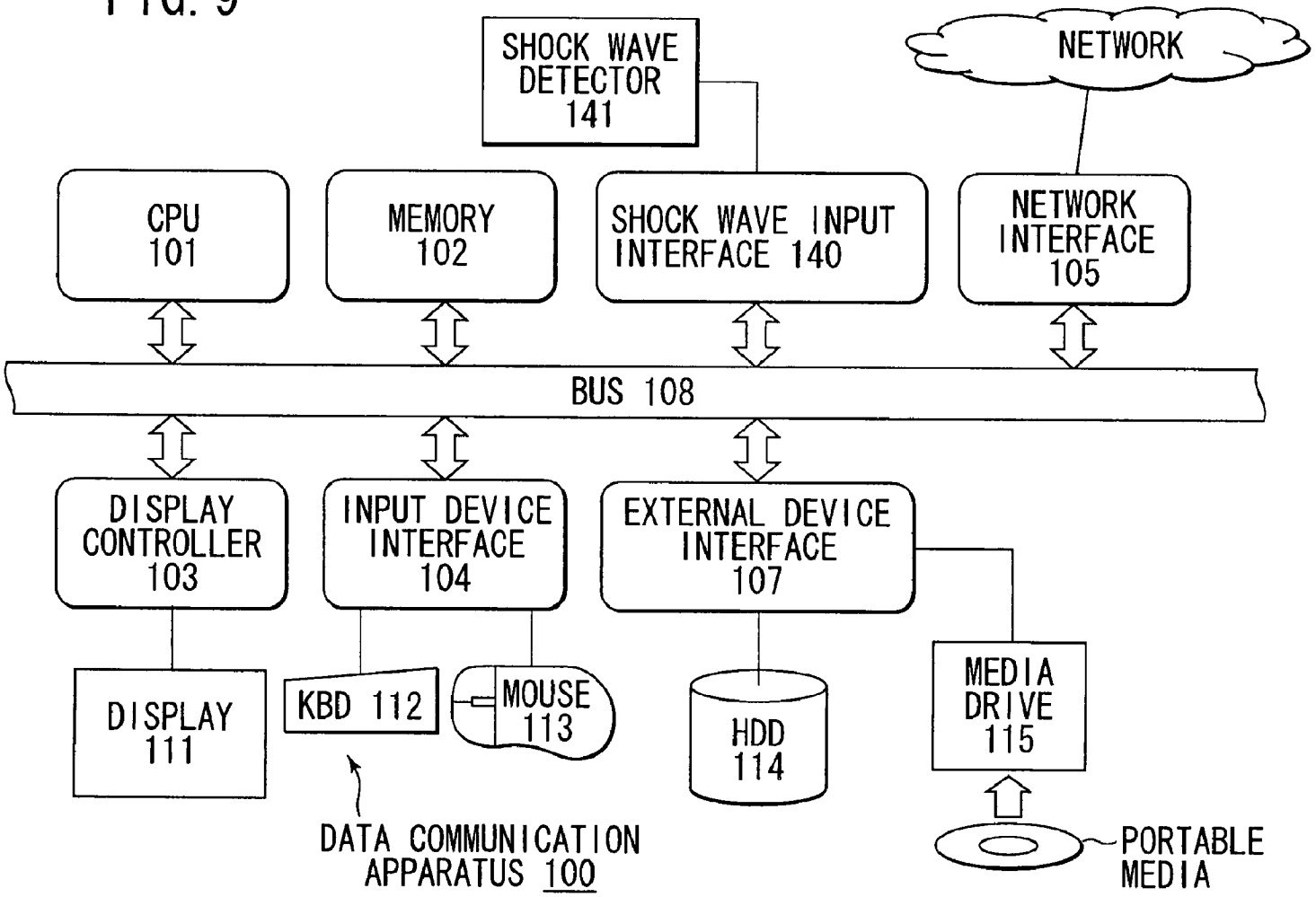
FIG. 9 is a diagram schematically showing the hardware configuration of a data communication apparatus 100 of a type that shares an actual world event by physical contact with a communication partner.

In FIG. 9, there is shown schematically the hardware configuration of the data communication apparatus 100 of a type that shares an actual world event by physical contact with a communication partner, such as hitting one data communication apparatus with another data communication apparatus.

The CPU (Central Processing Unit) 101, which is the main controller of the system 100, executes various applications under the control of an operating system (OS). The CPU 101 can execute, for example, a communication application and an application program for generating and observing actual world events, sharing actual world events, and searching for communication partners using shared actual world events, and the like. As shown in the drawing, the CPU 101 is interconnected with other devices and the like (which will be described later) via the bus 108.

The memory 102 is a memory apparatus that is used to store program codes executed in the CPU 101 and for temporarily holding work data under execution. It should be understood that the memory 102 shown in the same drawing includes both a non-volatile memory such as a ROM and the like and a volatile memory such as a DRAM and the like.

The display controller 103 is a dedicated controller for actually processing a drawing command issued by the CPU 101. Drawing data processed by the display controller 103 is first written to, for example, a frame buffer (not shown) and is then outputted on screen by the display 111.

The input device interface 104 is an apparatus for connecting user input devices such as the keyboard 112, the mouse 113 and the like to the computer system 100.

The network interface 105 can connect the system 100 to a network such as a LAN (local Area Network) and the like in accordance with a predetermined communications protocol such as Ethernet and the like.

The external device interface 107 is an apparatus for connecting external apparatuses, such as the hard disk drive (HDD) 114, the media drive 115 and the like, to the system 100.

The HDD 114 is a (known) external memory apparatus in which a magnetic disk as a memory substrate is fixedly mounted, and it is superior to other external memory apparatuses on points such as memory capacity, data transfer rate and the like. Placing a software program on the HDD 114 in an executable condition is referred to as an "installation" of the program to the system. Program codes of the operating system, application programs, device drivers and the like to be executed by the CPU 101, for example, are stored in a non-volatile condition in the HDD 114.

Also, the media drive 115 is an apparatus in which a portable medium such as a CD (Compact Disc), an MO (Magneto-Optical disc), a DVD (Digital Versatile Disk) or the like is loaded, and which is for accessing the data recording surface thereof.

A shock wave detector 141 converts a wave form pattern of a shock wave generated when physical contact is applied to the body of the data communication apparatus 100 into an electric signal and outputs it. A shock wave input interface 140 is an apparatus for importing a shock wave pattern detected by the shock wave detector 141 as computer data by inputting it. The shock wave detector 141 can be configured, for example, with a combination of a magnet and a magnet detector (a magnetic head, a hall element, a small inductance) placed opposite thereto. Alternatively, a piezo-element for converting vibration into electric signals can be used.

It is possible to handle physical contact with a communication partner, such as hitting one data communication apparatus with another data communication partner and the like, as an actual world event. In such a case, it should be understood fully that the shock wave detector 141 can function as an actual world event observing apparatus.

In addition, an example of the data communication apparatus 100 as shown in FIG. 9 is a personal computer, such as a compatible machine or a succeeding machine or the like of the personal computer "PC/AT (Personal Computer/Advanced Technology)" of IBM Corp., U.S.A. Of course, information processing terminals having a different architecture, such as, for example, PDAs (Personal Digital Assistants), mobile phones and the like, can also be applied as the data communication apparatus 100 according to the present embodiment.

Figure 10:
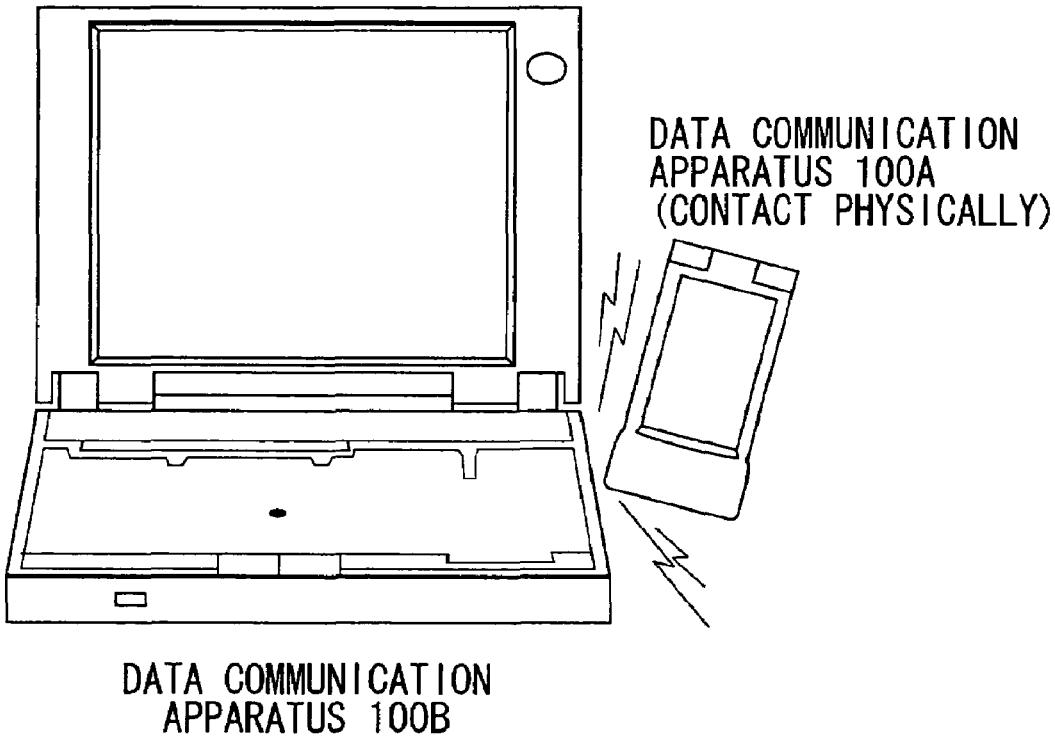
FIG. 10 is a diagram showing how output audio as an actual world even is shared between two data communication apparatuses having a configuration similar to the one shown in FIG. 9.

In FIG. 10, there is shown a manner in which an output audio as an actual world event is shared between two data communication apparatuses having a configuration similar to the one shown in FIG. 9. In the example shown in the same drawing, the data communication apparatus 100A that generates an actual world event is configured as a small portable information terminal such as a PDA (Personal Digital Assistant) or the like. Also, the data communication apparatus 100B that observes the actual world event is configured as a personal computer (PC) of a notebook type.

It is assumed that the data communication apparatuses 100A and 100B are owned by the same user or are respectively owned by users in the same group and that they are placed in close proximity such that actual world events can be shared. Also, although not shown in drawing, the data communication apparatuses 100A and 100B can be connected via a communication medium capable of data communications such as a LAN (Local Area Network) and the like.

For example, in a case where the data communication apparatus 100A wants to specify the data communication apparatus 100B as a communication partner, the user holds the data communication apparatus 100A in his hand, and applies a physical contact such as hitting the other data communication apparatus 100B. Each of the data communication apparatuses 100A and 100B stores the waveform pattern of a shock wave generated by the physical contact as content information of an actual world event and/or stores the time at which the physical contact occurred as the generation time information of the actual world event. As a result, between the data communication apparatuses 100A and 100B, the sharing of an actual world event is realized. Thereafter, the data communication apparatuses 100A and 100B can use the mutually shared actual world event as a clue and thereby search for a communication partner in the network.

Figure 11:
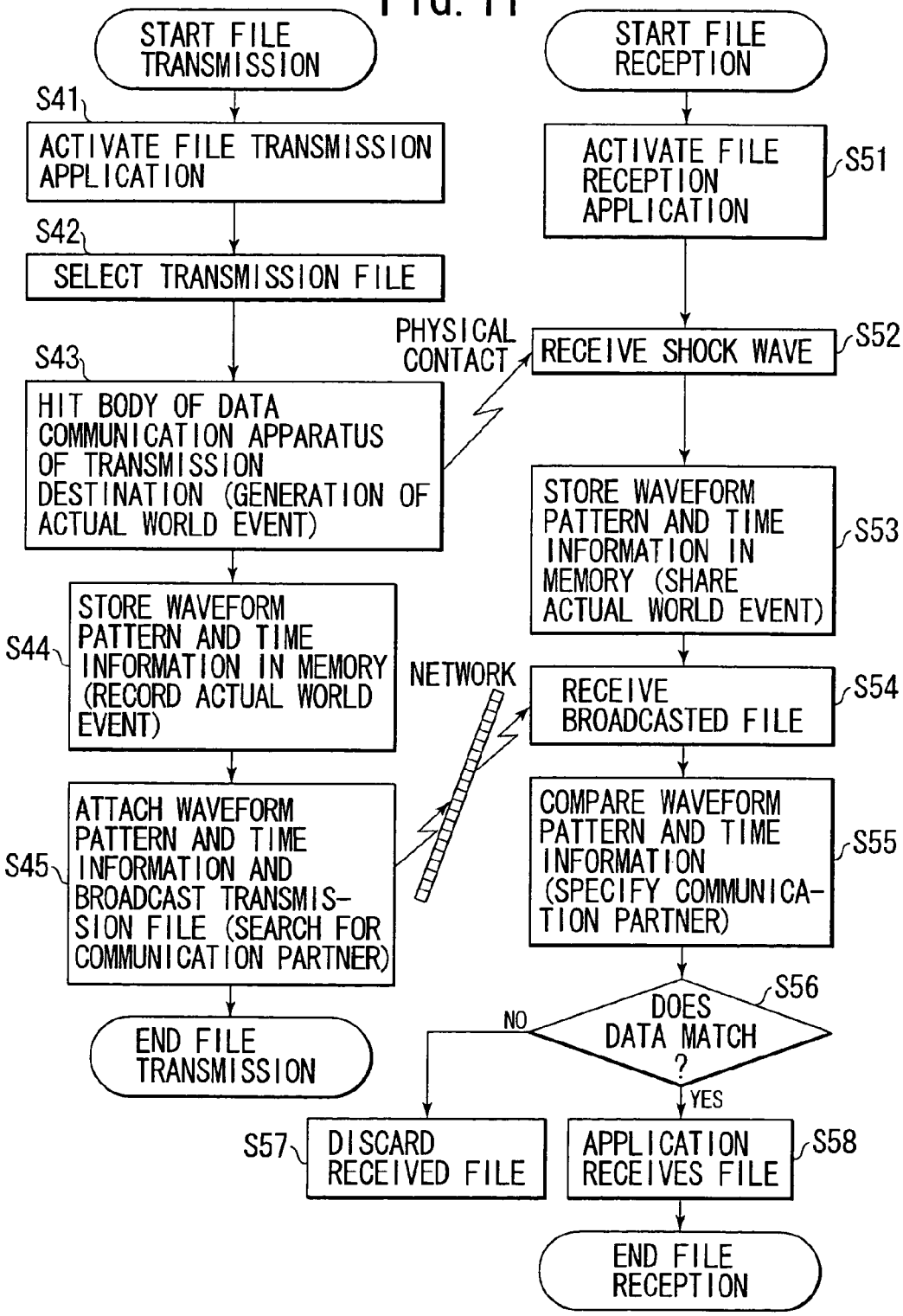
FIG. 11 is a diagram schematically showing the hardware configuration of a data communication apparatus 100 of a type that shares an actual world event by physical contact with a communication partner.

In FIG. 11, there is shown in the form of a flow chart a processing procedure for network-transferring a file between data communication apparatuses using the sharing of an actual world event comprising physical contact between apparatuses. Such a process, in actuality, is realized in a mode that the CPU 101 of each of the data communication apparatuses 100A and 100B executes a predetermined application program and performs a cooperative operation. The network transferring process based on the sharing of an actual world event will be described below with reference to this flowchart.

The data communication apparatus A as a file transmitting source, namely a PDA (hereafter simply referred to as PDA), activates a file transmission application (Step S41) and selects a transmission file (Step S42) using, for example, a menu screen (not shown) displayed on a display.

Next, the user generates physical contact between apparatuses (Step 43), such as taking the data communication apparatus 100A that is to become the file transmission source, namely the PDA (hereafter simply referred to as PDA), in his hand and hitting the data communication apparatus 100B that is to be a file transmission destination, namely a PC (hereafter simply referred to as PC).

When such physical contact is generated, a shock wave is generated on the PDA side. The shock wave detector 141 converts the wave form pattern of this shock wave into electric signals. Then, this wave form pattern and/or the generation time of the physical contact is stored in the memory 102 (Step S44).

Then, the PDA as the file transmission source, after generating the actual world event comprising the audio signal, attaches the actual world event content information and/or the time information stored in the memory 102 to the transmission file selected in step S42, and broadcasts it on the network (Step S45) and ends the file transmission process.

On the other hand, the PC side, which is a transmission destination of the file, activates a file reception application (Step S51), and waits until physical contact as an actual world event is inputted.

Then, when physical contact as an actual world event is generated, this is imported by the shock wave detector 141 (Step S52), the wave form pattern is recognized, and this is stored in the memory 102 as actual world event content information together with the detected time information (Step S53).

Thereafter, when the file broadcasted via the network is received (Step S54), the actual world event content information and/or the time information attached to the transmission file is extracted, and this is compared with the actual world event content information and/or the time information it stores itself (Step S55), and it is judged whether or not it shares the same actual world event as the data communication apparatus of the file transmission source.

If the actual world event content information and/or the time information does not match (Step S56), the same actual world event is not shared. Thus, it can be judged that the data communication apparatus of the file transmission source is not the correct communication partner (refer to FIG. 1(c)). Hence, the received file is discarded (Step S57).

On the other hand, if the actual world event content information and/or the time information does match (Step S56), the same actual world event is shared. Thus, it can be judged that the data communication apparatus of the file transmission source is the correct communication partner (refer to FIG. 1(c)). Hence, the application performs a receiving process on the broadcasted file (Step S58).

In addition, although the PDA as the file transmission source also transmits the time information in addition to the actual world event content information in order to search for a communication partner in the network, if uniqueness is sufficiently insured with the actual world event content information alone, only the actual world event content information need be attached to the transmission file. Of course, if uniqueness is sufficiently insured even with just the information on the time at which the actual world event was generated, a communication partner can be specified by merely attaching the time information.

Next, as another embodiment of the data communication system for performing data communications via a communication medium by searching for a communication partner whose identification information in the communication medium is not known, but whose location in the actual world is clear, such as being right in front, a communication system built between a personal computer (PC) and PDAs (Personal Digital Assistants) located close thereto will be described below.

Figure 12:
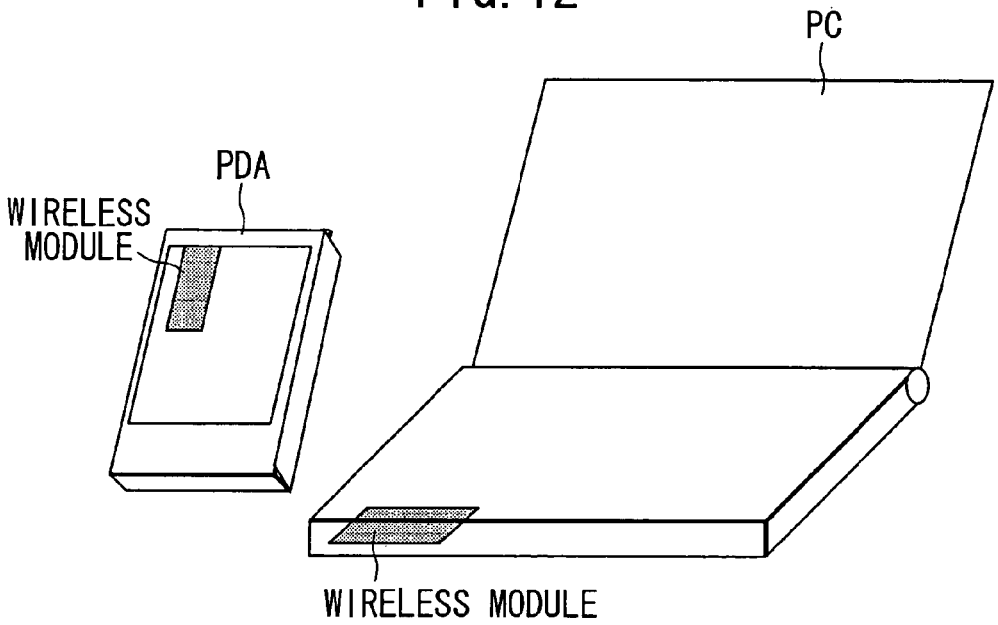
FIG. 12 is a diagram showing the configuration of a data communication system according to another embodiment of the present invention.

In FIG. 12, there is shown a data communication system configured with a PC and a PDA. In the above-mentioned embodiments, actual world events such as audio, optical signals, shock waves and the like are shared between neighboring information terminals. However, in the embodiment shown in FIG. 12, each of the information terminals has a wireless module, and is configured such that events are shared via a wireless communication interface.

Figure 13:
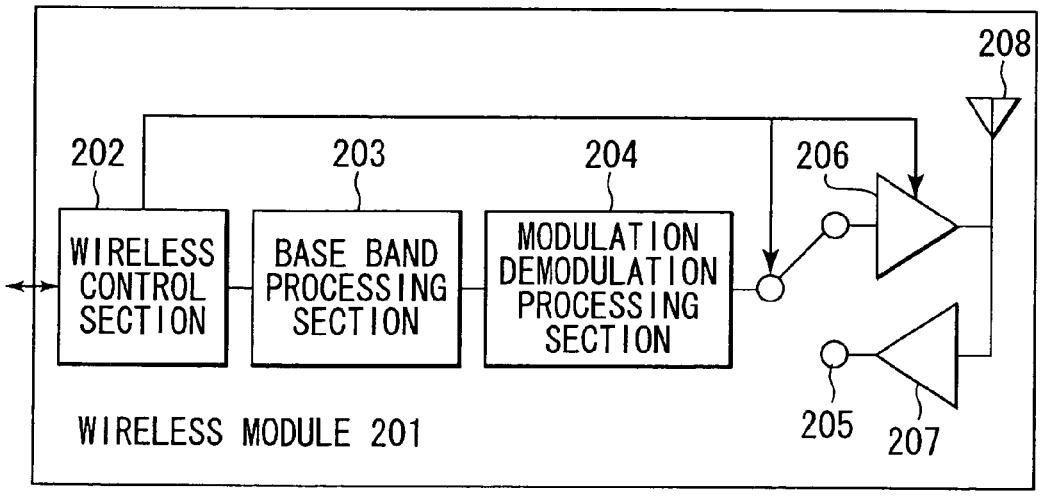
FIG. 13 is a diagram schematically showing the hardware configuration of a wireless module that is provided in order to share events between information terminals in another embodiment of the present invention.

In FIG. 13, there is shown schematically the hardware configuration of a wireless module 201 that is provided for the sharing of events between information terminals. As shown in the same drawing, the wireless module 201 has a wireless control section 202, a base band processing section 203 and a modulation demodulation processing section 204.

A transmission signal is transmitted from an antenna 208 via a power amplifier 206 after being processed by the wireless control section 202, the base band processing section 203 and the modulation demodulation processing section 204.

The power amplifier 206 can control the gain through the wireless control section 202, and can control transmission output from outside the wireless module via the wireless control section 202.

For this, a variation in which, instead of the control of the output by the power amplifier 206, the amplitude of an output signal is changed by the base band processing section 203 or the modulation demodulation processing section 204 is also possible.

In the present embodiment, by controlling the output power, since the reaching range of radio waves can be made variable, it becomes possible to control the communicable area. Thus, wireless communications, in which the communicable area is varied depending on the case, such as short range communications in which communication subjects are limited to a very short range, relatively long range communications in which the maximum possible output is used, and the like.

Figure 14:
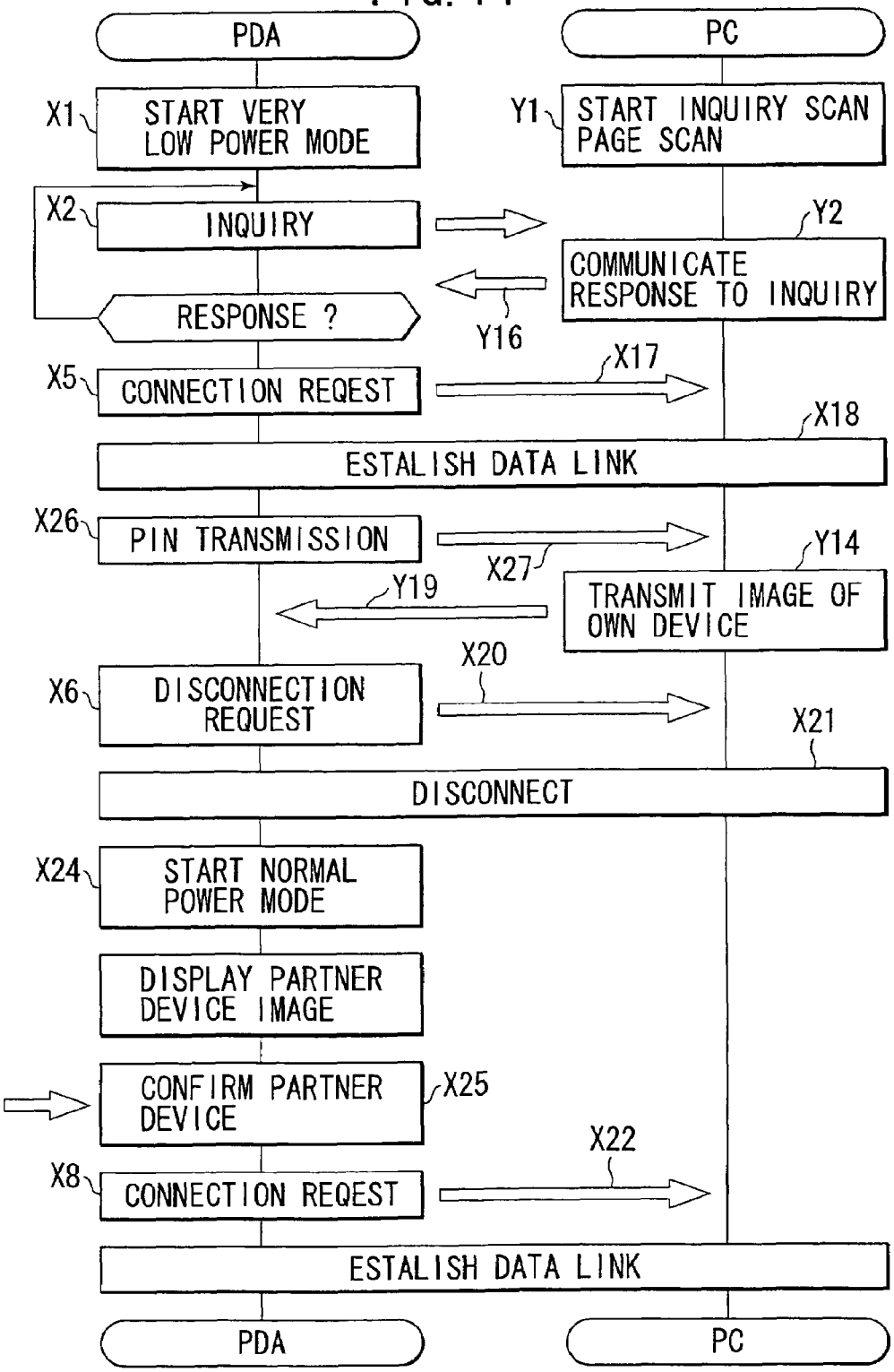
FIG. 14 is a sequence diagram showing the connection procedure in a case where the other embodiment of the present invention is realized using Bluetooth®.

In FIG. 14, there is shown a sequence of a connecting procedure when the present embodiment is realized using Bluetooth.

A PDA is periodically performing an inquiry (X2) in a very low power mode (X1). On the other hand, on the PC side, an inquiry scan is constantly performed (Y1).

Since the PDA side is performing inquiries with a very low power, the radio wave does not usually reach the PC.

Here, if the distance between the PDA and the PC is shortened by a user or for some other reason, the PC finds the inquiry signal of the PDA and returns a response signal called an FHS packet (Y2, Y16). Some information necessary for a connection request, such as the Bluetooth device address (a device address uniquely assigned to each Bluetooth module) of itself and the like is included in this FHS packet.

By performing a connection request specifying the Bluetooth device address of the PC (X5, X17), a data link is established between the PDA and the PC (X18).

The PDA transmits a character string for device authentication called a PIN code while still in the very low power mode in order to insure security (X26, X27).

The PC transmits to the PDA an image that is stored in advance which shows the appearance of itself (the PC) (Y14, Y19).

In this procedure, in order to further insure security, it is also possible to use public key encryption, such as, for example, having the PC that is to receive the transmission of the PIN code transmit a public key to the PDA in advance, and transmitting the PIN code from the PDA to the PC after encryption is performed therewith.

Here, the PDA disconnects the link (X6, X20 and X21). However, even if the link is not disconnected, there is no problem with the following procedure. Thus, the disconnection of the link is not essential.

From this point, the PDA ends the very low power mode, and performs transmission in a normal power mode (X24).

Next, in order to confirm a partner device, the partner device image obtained from the above-mentioned procedure is outputted to a display section, and a connection request is performed to the partner device (X8, X22).

Here, if there is a plurality of choices of partner devices, a plurality of these partner device images is displayed, and the selecting of a partner device can be done accurately by making the user choose therefrom (X25).

In addition, in the embodiment shown in FIGS. 12 to 14, it is also possible to realize a method where data in which a voice guide related to the machine itself is recorded is sent instead of the image of itself to be transmitted to the partner device. This is effective particularly for a device which does not have the capability to display an image of a sufficiently high level.

Supplement

Hereinabove, the present invention has been described in detail with reference to specific embodiments. However, it is obvious that those skilled in the art would be able to modify or substitute the embodiments mentioned above within an extent that does not depart from the scope of the present invention. In other words, the present invention has been disclosed in the form of examples, and should not be construed as being limiting. In determining the scope of the present invention, the section of the scope of claims should be considered.

INDUSTRIAL APPLICABILITY

According to the present invention, a data communication system, a data communication apparatus and a data communication method which are superior and which are capable of performing data communications with a communication partner whose identification information in a communication medium is unknown can be provided.

In addition, according to the present invention, a data communication system, a data communication apparatus and a data communication method which are superior and which are capable of suitably performing data communications with a communication partner whose location in the actual world is clear, such as being right in front, but whose identification information in a communication medium is unknown can be provided.

In addition, according to the present invention, a data communication system, a data communication apparatus and a data communication method which are superior and which are capable of performing data communications by searching for a communication partner whose location in the actual world is clear, such as being right in front, but whose identification information in a communication medium is unknown can be provided.

The invention claimed is:

[1. A data communication system for establishing data communications between a first device and a second device via a communication medium, wherein:

the first device comprises:

a processor and a memory;

a file transmission application for selecting a file for transmission;

a first event generating means for generating an actual world event and a first event detecting means for detecting an actual world event, wherein the second device exists in a same space as the first device, and the actual world event is generated and detected in the same space; and a first storing means for storing a first record of the actual world event, the first record including a set of wave patterns of the actual world event or a set of waveform patterns of the actual world event and an observation time of the actual world event, wherein the first device applies the actual world event to the second device in order to specify the second device as a communication partner; and the second device comprises:

a processor and a memory;

a second event detecting means for detecting the actual world event; and a second storing means for storing a second record of the actual world event detected by the second event detecting means, the second record including the set of wave patterns of the actual world event or the set of waveform patterns of the actual world event and the observation time of the actual world event;

wherein specifying the second device as the communication partner comprises the first device searching for the second device storing a record including the same one or more wave patterns or waveform patterns or the same observation time as the first record, and wherein the second device receives the file if the wave patterns or the waveform patterns or the observation time match in the search.]

[2. The data communication system according to claim 1, wherein the actual world event comprises an audio signal having a particular waveform pattern.]

[3. The data communication system according to claim 1, wherein the actual world event comprises a visible light having a particular waveform pattern.]

[4. The data communication system according to claim 1, wherein the actual world event comprises a shock wave applied to each communication partner at the same time.]

[5. A data communication method for establishing data communications between a first device and a second device via a communication medium, the data communication method comprising:

generating and detecting an actual world event, wherein the second device exists in a same space as the first device, and the actual world event is generated and detected in the same space, wherein the first device applies the actual world event to the second device in order to specify the second device as a communication partner;

storing, by the first device, a first record of the generated and detected actual world event, the first record including a set of wave patterns of the actual world event or a set of waveform patterns of the actual world event and an observation time of the actual world event;

detecting, by the second device, the actual world event; and storing, by the second device, a second record of the detected actual world event, the second record including the set of wave patterns of the actual world event or the set of waveform patterns of the actual world event and the observation time of the actual world event;

wherein a file is selected at the first device for transmission, and wherein specifying the second device as the communication partner comprises the first device searching for the second device storing a record including the same one or more wave patterns or waveform patterns or the same observation time as the first record, and wherein the second device receives the file if the wave patterns or the waveform patterns or the observation time match in the search.]

[6. The data communication method according to claim 5, wherein the actual world event comprises an audio signal having a particular waveform pattern.]

[7. The data communication method according to claim 5, wherein the actual world event comprises a visible light having a particular waveform pattern.]

[8. The data communication method according to claim 5, wherein the actual world event comprises a shock wave applied to each communication partner at the same time.]

[9. A first data communication apparatus for performing data communications for identifying a second data communication apparatus as a communication partner from a plurality of other communication apparatuses to communicate via a communication medium, the first data communication apparatus comprising:

a processor and a memory;

event generating means for generating an actual world event by the first data communication apparatus and event detecting means for detecting an actual world event generated outside of the first data communication apparatus, the same actual world event also being detected and a record of a set of wave patterns of the actual world event or a set of waveform patterns of the actual world event and an observation time of the actual world event being saved by the second data communication apparatus that exists in the same space as the first data communication apparatus, and the actual world event being generated and detected in a same space;

a selection means for selecting a file for transfer by the first data communication apparatus;

actual world event storing means for storing a record of the actual world event, the record including the set of wave patterns of the actual world event or the set of waveform patterns of the actual world event and the observation time of the actual world event; and searching means for specifying the second data communication apparatus which has a record of the same actual world event or the same event observation time of the actual world event saved by the actual world event storing means as a communication partner by searching the plurality of other communication apparatuses, wherein the searching means for specifying the second data communication apparatus searches the communication medium for the second data communication apparatus storing a record including the same one or more wave patterns or waveform patterns or the same event observation time as the actual world event, such that the second data communication receives the file when there is a match.]

[10. The data communication apparatus according to claim 9, wherein the actual world event comprises an audio signal having a particular waveform pattern.]

[11. The data communication apparatus according to claim 9, wherein the actual world event comprises a visible light having a particular waveform pattern.]

[12. The data communication apparatus according to claim 9, wherein the actual world event comprises a shock wave.]

[13. A data communication method for performing data communications including a first data communication apparatus for identifying a second data communication apparatus as a communication partner from a plurality of other communication apparatuses to transfer a file via a communication medium, the data communication method comprising the steps of:

generating an actual world event by the first data communication apparatus or detecting by the first data communication apparatus, an actual world event generated outside of the first data communication apparatus, the same actual world event also being detected and a record of a set of wave patterns of the actual world event or a set of waveform patterns of the actual world event and an observation time of the actual world event saved by the second data communication apparatus that exists in the same space as the first data communication apparatus, the actual world event being generated and detected in a same space;

storing, by the first data communication apparatus, a record of the set of wave patterns of the actual world event or the set of waveform patterns of the actual world event and the observation time of the actual world event;

transmitting a transmission file from the first data communication apparatus to the second data communication apparatus, the transmission file including attached thereto a record of the wave patterns of the actual world event or waveform patterns of the actual world event;

determining that the first data communication apparatus and the second data communication apparatus both store a record of the same actual world event by searching whether the second data communication apparatus stores a same actual world event record or a same event observation time stored in the first data communication apparatus; and receiving the file by the second data communication apparatus based on the determination that the first data communication apparatus and second data communication apparatus both store the record of the same actual world event or the same event observation time of the actual world event.]

[14. The data communication method according to claim 13, wherein the actual world event comprises an audio signal having a particular waveform pattern.]

[15. The data communication method according to claim 13, wherein in the actual world event comprises a visible light having a particular waveform pattern.]

[16. The data communication method according to claim 13, wherein the actual world event comprises a shock wave.]

*17. A data communication system for establishing data communications between a first device and a second device via a communication medium, comprising:*

*a generating means for generating an actual world event, wherein:*

*the first device comprises:*

*a first processor and a first memory;*

*a first event detecting means for detecting the actual world event; and*

*a first storing means for storing a first record of the actual world event detected by the first event detecting means, the first record including a first set of wave patterns of the actual world event, or a first set of waveform patterns of the actual world event, and a first observation time of the actual world event; and*

*the second device comprises:*

*a second processor and a second memory;*

*a second event detecting means for detecting the actual world event; and*

*a second storing means for storing a second record of the actual world event detected by the second event detecting means, the second record including a second set of wave patterns of the actual world event, or a second set of waveform patterns of the actual world event, and a second observation time of the actual world event;*

*wherein the second device exists in a same space as the first device and the actual world event is generated and detected in the same space,*

*wherein the first device searches for the second device storing the second record, and*

*wherein the first device specifies the second device as a communication partner when the wave patterns or the waveform patterns or the observation time of the first record and the second record match in the search, such that the first device and the second device share the actual world event.*

*18. The data communication system according to claim 17, wherein the actual world event comprises an audio signal having a particular waveform pattern.*

*19. The data communication system according to claim 17, wherein the actual world event comprises a visible light having a particular waveform pattern.*

*20. The data communication system according to claim 17, wherein the actual world event comprises a shock wave applied to each communication partner at the same time.*

*21. A data communication method for establishing data communications between a first device and a second device via a communication medium, the data communication method comprising:*

*generating an actual world event;*

*detecting, by the first device, the actual world event;*

*storing, by the first device, a first record of the actual world event detected by the first device, the first record including a first set of wave patterns of the actual world event, or a first set of waveform patterns of the actual world event, and a first observation time of the actual world event;*

*detecting, by the second device, the actual world event; and*

*storing, by the second device, a second record of the detected actual world event detected by the second device, the second record including a second set of wave patterns of the actual world event, or a second set of waveform patterns of the actual world event, and a second observation time of the actual world event;*

*wherein the second device exists in a same space as the first device and the actual world event is generated and detected in the same space,*

*wherein the first device searches for the second device storing the second record, and*

*wherein the first device specifies the second device as a communication partner when the wave patterns or the waveform patterns or the observation time of the first record and the second record match in the search, such that the first device and the second device share the actual world event.*

*22. The data communication method according to claim 21, wherein the actual world event comprises an audio signal having a particular waveform pattern.*

*23. The data communication method according to claim 21, wherein the actual world event comprises a visible light having a particular waveform pattern.*

*24. The data communication method according to claim 21, wherein the actual world event comprises a shock wave applied to each communication partner at the same time.*

* * * * *